Feb. 23, 1926. 1,574,042
S. R. W. M. BAGER ET AL
CREEPING TRACTION TREAD AND COOPERATING TUMBLER
Original Filed Feb. 7, 1921
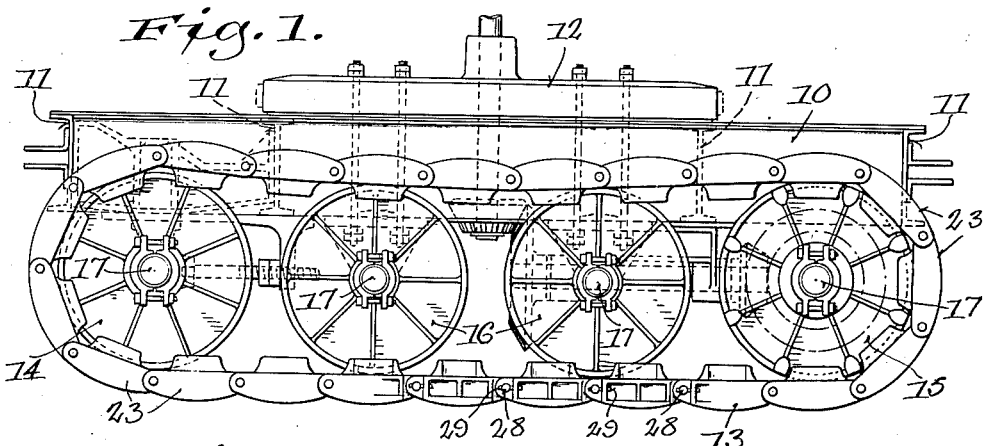
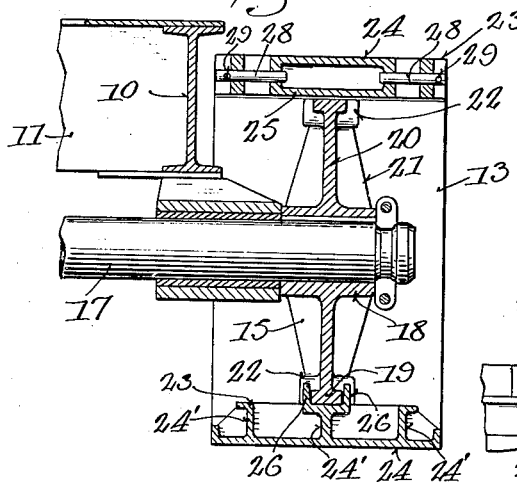
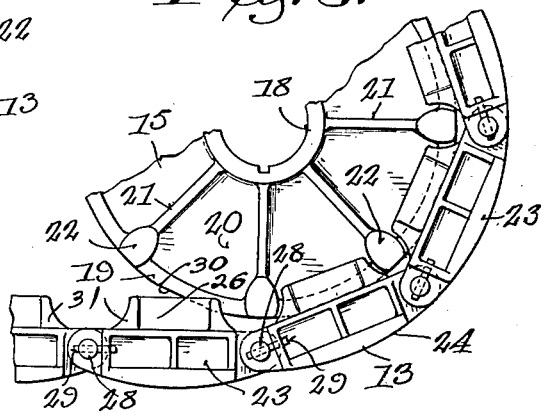
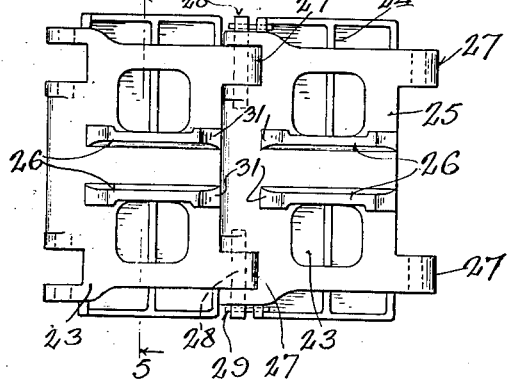
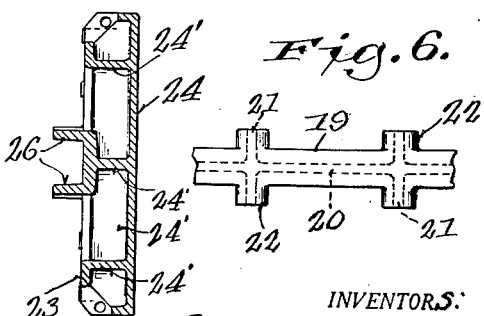
INVENTORS:
SVANTE R.W.M. BAGER
WERNER LEHMAN
BY Ralph W. Brown.
ATTORNEY.

Patented Feb. 23, 1926.

1,574,042

UNITED STATES PATENT OFFICE.

SVANTE R. W. M. BAGER AND WERNER LEHMAN, OF SOUTH MILWAUKEE, WISCONSIN, ASSIGNORS TO BUCYRUS COMPANY, OF MILWAUKEE, WISCONSIN, A CORPORATION OF WISCONSIN.

CREEPING TRACTION TREAD AND COOPERATING TUMBLER.

Original application filed February 7, 1921, Serial No. 443,164. Divided and this application filed October 10, 1921, Serial No. 506,630. Renewed October 31, 1925.

*To all whom it may concern:*

Be it known that we, SVANTE R. W. M. BAGER and WERNER LEHMAN, citizens of the United States, residing at South Milwaukee, in the county of Milwaukee and State of Wisconsin, have invented a certain new and useful Improvement in Creeping Traction Treads and Cooperating Tumblers, of which the following is a full, clear, concise, and exact description, reference being had to the accompanying drawings, forming a part of this specification.

This invention relates to creeping traction mechanisms and, more particularly, to the endless tread belts and driving tumblers for use therewith.

One object of the present invention is the provision of an endless tread belt of very sturdy construction, having a relatively broad tread surface and otherwise well adapted for use as a traction unit and support for power excavators and other heavy portable machinery.

Another object is the provision in an endless tread belt of novel and improved means for effecting a positive drive connection between the belt and the cooperating driving tumbler.

Another object is the provision of a simply constructed driving tumbler of a new and improved design.

Other objects and advantages will later appear.

One embodiment of this invention is illustrated in the accompanying drawings, in which:

Figure 1 is a side elevation of an excavator supporting frame equipped with a traction mechanism embodying the novel features of the present invention.

Figure 2 is a vertical sectional view of a tread belt taken through the axis of a driving tumbler.

Figure 3 is a fragmentary side elevation of the parts shown in Figure 2.

Figure 4 is a plan view of a pair of connected tread belt links.

Figure 5 is a sectional view of one of the tread belt links taken substantially on the line 5—5 of Figure 4.

Figure 6 is a fragmentary edge view of one of the tumblers.

The excavator supporting frame shown in Figure 1 is substantially identical with the frame described in the copending application of S. R. W. M. Bager, Serial No. 443,-106, filed February 7, 1921, and in our copending application, Serial No. 433,164, filed February 7, 1921, of which this application is a division. It will suffice here to say that this frame is substantially rectangular in form and includes a pair of longitudinal side sills 10 in the form of heavy I-beams and a plurality of transverse sills 11, connected together and braced by an annular rack and track member 12 constituting a turn-table support for the heavy excavating machinery (not shown) ordinarily revolubly mounted thereon.

The traction mechanism herein shown is also substantially identical with that disclosed in our copending application last above identified. This mechanism includes a pair of endless tread belts 13 mounted on either side of the frame and passing around the front and rear wheels 14 and 15 thereof. Additional frame supporting wheels 16 are provided on each side of the frame intermediate the front and rear wheels. Each of these intermediate wheels 16 bears upon the lower run of the belt and serves to sustain the upper run thereof against excessive sagging.

The several wheels 14, 15 and 16 are mounted upon shafts 17 separately connected with the frame. Each wheel comprises a relatively wide hub 18, and a relatively narrow rim 19 integrally connected by a web 20, reinforced by radial stiffening ribs 21. These wheels, though of comparatively light construction, are well able to sustain the heavy loads and transverse stresses imposed thereon during continued use. The rear wheels 15 constitute the driving tumblers, and for this reason each is provided along the rim thereof with a series of projections 22 constituting driving lugs which cooperate with the tread belt in a manner to be later described, to establish a positive drive connection therewith. These lugs 22 are preferably arranged at the junctures of the ribs 21 with the rim 19.

Each tread belt is made up of a series of hingedly connected links 23 which together constitute a substantially continuous relatively broad tread surface for engagement with the ground. Each link comprises a casting, preferably hollow for purposes of lightness, having an outer wall 24 constituting the tread portion thereof. Stiffening ribs 24' project inwardly from the wall 24 and merge into the skeleton inner wall 25, which carries a pair of centrally disposed parallel flanges 26 spaced apart a distance corresponding to the width of the rims 19 of the several wheels 14, 15 and 16. The flanges 26 of the several links extend longitudinally of the belt and together define a centrally disposed wheel receiving guideway or channel along the inner face of the belt. Each link 23 extends somewhat beyond the ends of the channels 26 so as to provide a space between the ends of the channels of adjacent links for receiving the lugs 22 of the driving tumblers 15. A positive drive connection is thus established between the driving tumblers and the tread belts.

The several wheels 14, 15 and 16, embraced within each tread belt, engage within and travel along the guideway defined by the flanges 26, that portion of the inner wall 25 of each link, constituting the base of the guideway, being substantially flat so as to provide a substantially smooth track for the intermediate wheels 16. The peripheries of the wheels 14, 15 and 16 are circular, except for the flattened portions 30 formed upon the periphery of each of the driving tumblers 15 intermediate successive lugs 22. These flattened portions are sufficiently extended to afford ample bearing contact between the driving tumblers and their cooperating links 23, to sustain the pressures and to insure proper engagement of the lugs 22 between the ends of adjacent flanges 26. At the same time the flattened portions are not so extended or pronounced as to cause a bumping action of the tumblers as they engage and roll along the lower run of the belt. In the mechanism shown (Fig. 3), each flattened portion 30 occupies substantially the middle one third portion of a sector comprised between adjacent lugs 22.

It has been found that the driving faces of the lugs 22 and ends 31 of the flanges 26 should be curved in order to obtain maximum driving surfaces, and yet insure ample clearance of the lugs 22 during engaging and disengaging. Practical experimentation has demonstrated that the best results are attained when each end 31 of the flanges is of concave form presenting a curved face whose center of curvature is disposed in line with or above the upper or free edge of the flange, and when the driving faces of the lugs 22 are of convex form of similar curvature. In the mechanism shown, particularly in Figure 3, the center of curvature of each concave end surface 31 of a flange 26 is located in line with the free longitudinal edge of the flange and in position where it substantially coincides with the center of curvature of the abutting face of a cooperating lug 22 when the end of the flange is in driving relation therewith. The radius of curvature of the driving faces of the lugs is preferably a trifle less than that of the driving surfaces of the flanges. The upper portions of the driving surfaces 31 are preferably reversely curved or otherwise slightly modified to insure ample engaging and disengaging clearance between the lugs and flanges.

The links are hingedly connected, preferably at points adjacent the outer edges of the belt, so as to provide an exceedingly sturdy construction. For this purpose, each link is provided at one edge thereof with a pair of pivot ears 27 spaced a substantial distance beyond the flanges 26, the intermediate portion of the edge remaining substantially straight for purposes of strength and rigidity and to permit a close fit with the adjacent edge of the adjoining link. The other edge is substantially straight except for appropriate recesses formed therein to snugly receive the pivot ears of the next adjacent link. Pivot pins 28 are passed through the interengaging parts thus formed and held in place by small retaining pins 29, which extend through the ends of the pivot pins and are engaged in adjacent corners of the corresponding links.

It will be noted that each belt is engaged only in the central portion thereof by the several wheels 14, 15 and 16. Furthermore, the wheel rims and consequently the wheel receiving channels are very narrow relative to the width of the belt. The flanges 26 are thus disposed well within the outer edges of the belt where they and the channel defined thereby remain comparatively free and clear from foreign matter that might climb over the edges of the belt.

Various changes may be made in the embodiment of the invention hereinabove described, without departing from or sacrificing any of the advantages of the invention as defined in the appended claims.

We claim:

1. An endless tread belt for creeping traction mechanisms comprising a series of tread belt links, each having a broad ground engaging surface on one side thereof, a single centrally disposed wheel engaging surface on the other side thereof for receiving the load, wheel guiding means associated with said wheel engaging surface, laterally spaced means at one edge of each link in the plane thereof for connection with the next adjacent link, said means being disposed at opposite sides of said wheel engaging surface, and a rigid straight edge portion extending between said means and closely associated with the edge of said adjacent link to prevent the passage of foreign matter therebetween.

2. A tread belt link for creeping traction mechanisms having a broad ground engaging surface on one side thereof, a single narrow wheel receiving channel centrally disposed on the other side thereof, the base of said channel being substantially flat to form a smooth runway for the wheels, a pair of pivot ears on one edge of said link arranged at opposite sides of said channel, and a pair of recesses in the opposite edge of said link for receiving the pivot ears of an adjacent link, the edge portions of said link intermediate said ears and said recesses being substantially straight for purposes of rigidity and to permit a close fit with adjacent links.

3. A tread belt for creeping traction mechanisms comprising a series of connected links, each link having a relatively broad tread surface, a flat, relatively narrow, centrally disposed wheel engaging surface, wheel guiding means associated with said last named surface, a pair of ears integrally formed on one edge of each link, in the plane thereof, said ears being disposed at opposite sides of said last named surface, recesses formed in the opposite edge of each link for receiving the ears of an adjacent link, and a separate pivot pin associated with each ear.

4. In a creeping traction unit, the combination of a series of wheels including a driving tumbler and an endless tread belt trained about said series of wheels, said belt comprising a series of closely associated links forming a substantially unbroken tread surface on one side and a narrow centrally disposed surface on the other side on which all of said wheels engage, and laterally spaced hinge connections between successive links arranged at opposite sides of said wheel engaging surface and within the plane of each link.

5. In a creeping traction mechanism the combination of a tread belt comprising a series of connected links, each comprising an integral casting having a relatively broad tread surface, a relatively narrow flat centrally disposed wheel engaging surface and upstanding wheel guiding flanges, load sustaining wheels disposed between said flanges, a driving tumbler disposed between said flanges, and lateral lugs on said tumbler disposed for driving engagement with said flanges.

6. In a creeping traction mechanism the combination of an endless tread belt comprising a series of connected links, each link having a relatively broad tread surface, upstanding flanges, and a flat surface between said flanges forming a substantially continuous roller path, a tumbler disposed to travel along said path, and lateral lugs on said tumbler for driving engagement between the flanges of successive links, the periphery of said tumbler being flattened between successive lugs permitting deep engagement of said lugs between said flanges.

7. In a creeping traction mechanism the combination of a tread-belt comprising a series of connected links, each comprising an integral casting having a relatively broad tread surface, upstanding wheel-guiding flanges and a single centrally-disposed wheel-engaging surface of such narrowness as to render the tread-belt laterally flexible so that it will accommodate itself to lateral irregularities in the ground surface, a driving tumbler disposed between said flanges, and lateral lugs on said tumbler disposed for driving engagement between the flanges of successive links.

In witness whereof, we hereunto subscribe our names this 4th day of October, 1921.

SVANTE R. W. M. BAGER.
WERNER LEHMAN.